United States Patent [19]

Lumikko et al.

[11] 4,264,445
[45] Apr. 28, 1981

[54] PRESSURIZED FILTER

[75] Inventors: Juha Lumikko; Matti Lankinen; Jaakko Savolainen; Martti Tolvanen; Yrjö Luukkainen; Holger Engdahl, all of Savanlinna, Finland

[73] Assignee: Enso-Gutzeit Osakeythiö, Helsinki, Finland

[21] Appl. No.: 97,691

[22] Filed: Nov. 26, 1979

[30] Foreign Application Priority Data

Nov. 28, 1978 [FI] Finland .................................. 783633

[51] Int. Cl.³ ........................ B01D 29/38; B01D 29/30
[52] U.S. Cl. ............................. 210/323.2; 210/333.01
[58] Field of Search ............ 210/323 T, 333 A, 333 R

[56] References Cited

U.S. PATENT DOCUMENTS

| 2,562,699 | 7/1951 | Cooperson et al. | 210/333 X |
| 2,862,622 | 12/1958 | Kircher, Jr. et al. | 210/333 |

FOREIGN PATENT DOCUMENTS 2140159  2/1973  Fed. Rep. of Germany ...... 210/333 A

Primary Examiner—Frank A. Spear, Jr.
Attorney, Agent, or Firm—Toren, McGeady and Stanger

[57] ABSTRACT

An intermittently operating pressurized filter for concentrating a solid matter suspension, comprising a filtering tank with an inlet conduit provided with a feed pump for introducing under pressure the suspension to be filtered, and a draining conduit provided with valve for removal of the concentrated sludge, and a plurality of filtering elements suspended from the roof, through which the filtrate flows and of which the interior communicates with a filtrate collecting tank located above and which thereby collect on their external surface sludge, which has been arranged to be periodically removed by voiding the pressure within the filtering tank by opening for the suspension therein an exit flow path through a draining conduit. The filtrate in the collecting tank will pass in countercurrent fashion through the filtering elements. In the pressurized filter the filtrate has been arranged to be removed during the filtering step by a filtrate draining conduit departing from the collecting tank, by effect of the pressure produced by the feed pump in the suspension inlet conduit. The collecting tank is of enclosed construction. The sludge has been arranged to be removed from the surface of the filtering elements by the aid of the hydrostatic pressure of the filtrate in the collecting tank, by placing th draining conduit of the collecting tank under atmospheric pressure.

2 Claims, 3 Drawing Figures

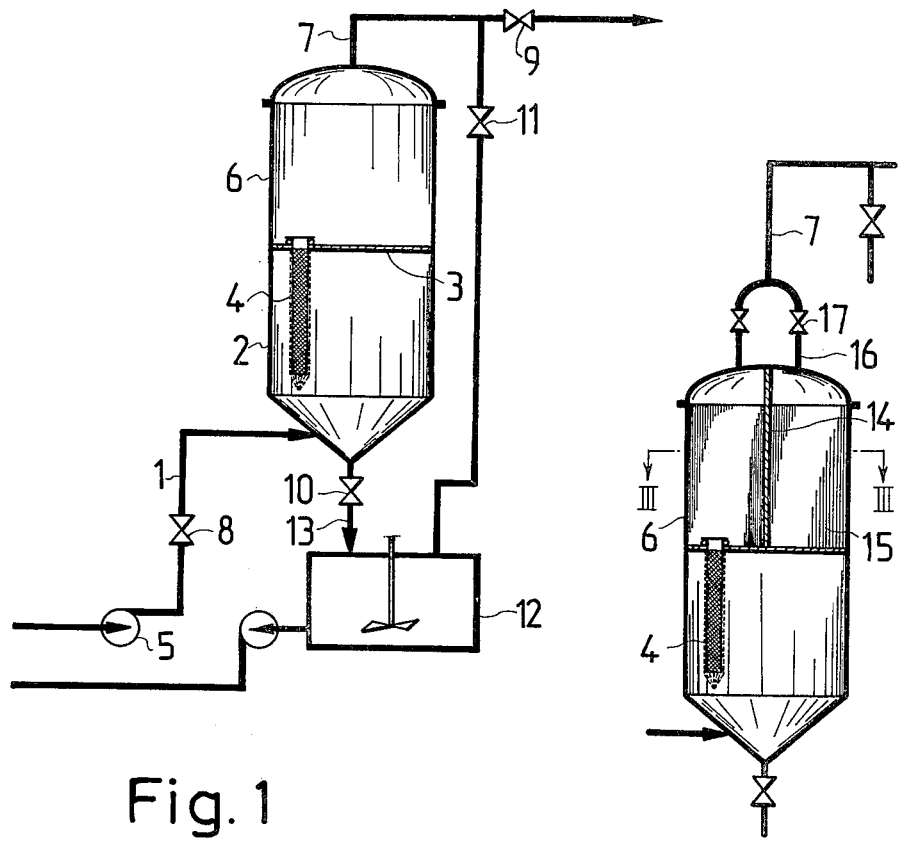
Fig. 1
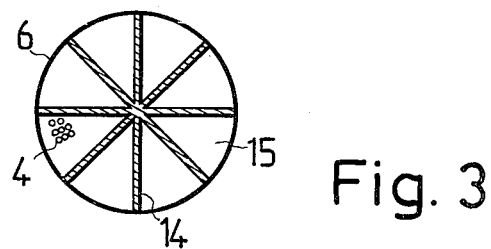
Fig. 2
Fig. 3

PRESSURIZED FILTER

The present invention concerns an intermittently operating pressurized filter for concentrating a solid matter suspension, comprising a filter tank and on this tank an inlet conduit provided with a supply pump, for introducing under pressure the suspension to be filtered, and an outlet conduit provided with a valve, for removing the concentrated sludge, and a plurality of filtering elements suspended from the roof, the filtrate flowing through these elements and the interior of these elements communicating with a filtrate collecting tank located thereabove and thereby collecting sludge on their external surface, and this sludge being arranged to be intermittently detached by voiding the pressure within the filtering tank by opening for the suspension residing therein an exit flow through a drain conduit, whereby the filtrate in the collecting tank will pass in countercurrent fashion through the filtering elements, and in said pressurized filter the filtrate being arranged during the filtering step to be removed through a filtrate draining conduit departing from the collecting tank, under effect of the pressure produced by the supply pump in the suspension inlet conduit.

A pressurized filter of this type is eminently suitable for use in filtering white liquor from lime milk in the digesting liquor regenerating process in sulphate pulp mills, but it is also well applicable in other filtering operations.

The problem in connection with pressurized filters of this type known in the art is the removal of the sludge from the surface of the filtering elements. As taught by the present invention, this problem is solved in a simple manner. The invention is characterized in that the collecting tank is of enclosed construction, and that the sludge has been arranged to be removed from the surface of the filtering elements with the aid of the hydrostatic pressure of the filtrate residing in the collecting tank, by applying atmospheric pressure to the draining conduit of the collecting tank. The filtrate will then flow in countercurrent fashion through the filtering elements and it will detach the sludge from the filtering elements.

The draining conduit of the filtering tank is usually connected to a washing tank. One advantageous embodiment of the invention is then characterized in that the filtrate draining conduit departing from the collecting tank is connected by a falling pipe, provided with a valve, to the washing tank and that the draining conduit of the collecting tank has been arranged so that it can be placed under atmospheric pressure by opening the valve in the falling pipe.

One advantageous embodiment of the invention is characterized in that the collecting tank has been subdivided by means of partitions into sections, a specific branch conduit provided with a valve departing from each such section, and that these branch conduits have been joined to constitute a common draining conduit. Thanks to this arrangement, any one section can be shut off to be inoperable. This is necessary in the case that it is observed that the filtrate coming into the particular section is impure, this constituting a sign indicating that one of the filtering elements, or filtering mantles, supplying filtrate into this section is damaged.

The invention shall be described in the following, making reference to the attached drawing, wherein:

FIG. 1 displays a pressurized filter, according to an embodiment of the invention, sectioned and incorporated in a diagram of operation.

FIG. 2 presents the pressurized filter according to another embodiment, sectioned.

FIG. 3 shows the section carried along the line III—III in FIG. 2.

The suspension which one wishes to filter, or in this case the lime milk, enters the filtering tank 2 by the inlet conduit 1, driven by the feed pump 5. From the roof 3 of the tank 2, cylindrical filtering elements 4 are suspended. These elements may be, for instance, 200 in number, though in the drawing only one such element has been depicted in considerably enlarged size.

The white liquor contained in the lime milk is filtered by effect of the pressure prevailing in the filtering tank 2, through the mantle on the filtering element, and the solid matter of the lime milk, or the lime sludge, is deposited on the surface of the filter mantle. The filtrate, that is the white liquor, is carried into the collecting tank 6 located above, whence it goes, driven by the feed pump 5, to the filtrate draining conduit 7 and further to the digesting plant or into a storage tank. Removal of the lime sludge which has accumulated on the filtering element 4, or upon the mantle, is accomplished as follows. The feed pump 5 is stopped and the valves 8 and 9 are closed. Valves 10 and 11 are opened. The pure liquor in the collecting tank 6 will now flow through the filtering elements 4 into the filtering tank 2 and it will thereby detach the lime milk layer from the surfaces of the mantles. The lime sludge and liquor flow through the draining conduit 13 into the washing tank 12, whence the mixture is pumped either to a suction filter or to a clarifier. During this washing step, the filter draws air through the valve 11.

After the filter has been emptied, the valve 10 is closed and valve 8 is opened, and the feed pump 5 is started. After the filter thus has been refilled, valve 11 is closed and valve 9 opened, whereby another filtering period will commence. All these operations may naturally be automated.

It is thus understood that the filter operates intermittently, its operation being divided into a filtering period and a washing period. The length of the filtering period is determined by the lime sludge content of the lime milk, as follows:

| Sludge content | Filtering period |
| --- | --- |
| 1000 mg/l | 6 hours |
| 500 mg/l | 12 hours |
| 300 mg/l | 20 hours |
| 150 mg/l | 38 hours |

The duration of the washing period is between 1 and 5 min., and thereby the filtering period will be more than 99% of the total time of operation. The purity of the white liquor after filtering is less than 10 mg/l, and the degree of purity of the input liquor has no substantial effect on the end result. The pressurized filter depicted in FIGS. 2 and 3 differs from that just presented in that the collecting tank 6 has been subdivided by means of vertical partitions 14 into sections 15. From each section departs a specific branch conduit 16, which has been provided with a shut-off valve 17. After the valves 17, the branch conduits have been combined to form a common draining conduit 7. In this embodiment one is enabled to shut out of operation any one section in case impure filtrate should flow into this section, which on the other hand indicates that one of the mantles is faulty.

It is obvious to a person skilled in the art that different embodiments of the invention may vary within the scope of the claims presented hereinbelow. For instance, the pressurized filter of the invention may be used to other purposes as well, not only for filtering lime sludge out of lime milk.

We claim:

1. Improvement in an intermittently operating pressurized filter for concentrating a solid matter suspension, comprising a filtering tank having a roof at the upper end thereof, an inlet conduit connected to said filtering tank, a feed pump connected to said inlet conduit for introducing the suspension to be filtered under pressure into said filtering tank, a valve located in said inlet conduit between said feed pump and said filtering tank, a draining conduit connected to said filtering tank for removing concentrated sludge, a valve located in said draining conduit, a plurality of filtering elements dependently supported from said roof in said filtering tank and arranged so that the filtrate flows through said filtering elements, a filtrate collecting tank mounted on said filtering tank with said roof forming a partition therebetween so that the filtrate flowing into said filtering elements flows into said filtrate collecting tank with the sludge in the solid matter suspension collecting on the outer surface of said filtering elements within said filtering tank, the sludge collecting on the external surface of the filtering elements being periodically removable by cutting off the pressure within said filtering tank and opening said draining conduit for providing an exit flow path from said filtering tank, whereby the filtrate within said collecting tank passes in countercurrent fashion through said filtering elements back into said filtering tank and removing the concentrated sludge collected on the external surfaces of said filtering elements, a filtrate draining conduit connected to said collecting tank for removing the filtrate during the filtering operation by the effect of the pressure produced by said feed pump in directing the suspension through said inlet conduit into said filtering tank, said collecting tank being of an enclosed construction, wherein the improvement comprises a washing tank connected to said draining conduit at a position spaced outwardly from said filtering tank with said valve therein located between said washing tank and said filtering tank, a fall pipe connected to said filtrate draining conduit at one end and to said washing tank at the other end, a valve located in said fall pipe between said filtrate draining conduit and said washing tank whereby said filtrate draining conduit from said collecting tank being placeable under atmospheric pressure by opening said valve in said fall pipe.

2. Pressurized filter, as set forth in claim 1, wherein a plurality of partitions are located within said filtrate collecting tank for dividing said collecting tank into separate sections extending between said filtering elements and said filtrate draining conduit, a branch conduit each containing a shut-off valve extending between each said section and said filtrate draining conduit so that each said section can be cut off individually while the remaining said sections continue the filtering operation.

* * * * *